United States Patent [19]

Sano et al.

[11] Patent Number: 5,086,648
[45] Date of Patent: Feb. 11, 1992

[54] SIMULATION SYSTEM FOR AUTOMOTIVE PRIME MOVER

[75] Inventors: Kaoru Sano; Fumio Mizushina; Takashi Goto; Toshimitsu Maruki, all of Shizuoka, Japan

[73] Assignee: Kabushiki Kaisha Meidensha, Tokyo, Japan

[21] Appl. No.: 619,407

[22] Filed: Nov. 29, 1990

[30] Foreign Application Priority Data

Nov. 30, 1989 [JP] Japan .................................. 1-310883

[51] Int. Cl.$^5$ ............................................ G01M 19/00
[52] U.S. Cl. .................................. 73/118.1; 73/865.6
[58] Field of Search ...................... 73/117.3, 117, 118.1, 73/116, 865.6

[56] References Cited

U.S. PATENT DOCUMENTS

| 4,468,958 | 9/1984 | Takeshita ............................ 73/118.1 |
| 4,758,967 | 7/1988 | Shmuter et al. ....................... 73/117 X |

FOREIGN PATENT DOCUMENTS

| 58-10625   | 1/1983 | Japan . |
| 58-38833   | 1/1983 | Japan . |
| 61-53541   | 3/1986 | Japan . |
| 63-2115738 | 4/1990 | Japan . |
| 63-148309  | 5/1990 | Japan . |

Primary Examiner—Jerry W. Myracle
Attorney, Agent, or Firm—Ronald P. Kananen

[57] ABSTRACT

A simulation system for an automotive internal combustion engine includes a low inertia power generator which includes a direct current motor and a speed increasing device. An engine characteristic generator derives a first signal indicative of a first output torque to be derived as an output of the low inertia power generator. The first output torque is equivalent to that of the engine. A first compensation torque is derived for compensation in view of a set engine inertia. A second compensation torque is further derived for compensation in view of a set inertia of the low inertia power generator. A third compensation torque is further derived based on the first and second compensation torques for compensating a differential in inertia between the engine and the low inertia power generator. A control signal is derived based on the first signal and the third compensation torque. The control signal is fed to the low inertia power generator for controlling operation of the direct current motor so as to provide a second output torque as the output of the low inertia power generator. The second output torque is equivalent to the first output torque. Accordingly, an output characteristic equivalent to that of the engine is provided as the output of the low inertia power generator.

11 Claims, 3 Drawing Sheets

SIMULATION SYSTEM FOR AUTOMOTIVE PRIME MOVER

BACKGROUND OF THE INVENTION

1. Field of the Invention

The present invention relates generally to a simulation system for an automotive prime mover, such as an internal combustion engine, for testing automotive components, such as an automatic or manual power transmission. More specifically, the present invention relates to a simulation system for an automotive internal combustion engine which provides an output characteristic equivalent to that of the automotive engine.

2. Description of the Background Art

Japanese Patent First Publications (Tokkai) Nos. 58-38833 and 61-53541 each disclose a bench testing system for an automatic power transmission. In the disclosed system, an electric motor or a hydrostatic motor with a speed increasing device is used in place of an automotive internal combustion engine.

As appreciated, since the electric motor or the hydrostatic motor has a much larger inertia in comparison with the automotive engine, it is practically difficult to control the operation of those motors, even combined with the speed increasing device, to simulate the transitional characteristic of the automotive engine at the shift of a transmission speed ratio. For example, the electric motor has a inertial magnitude about 10 times greater than that of the automotive engine.

Accordingly, in general, the automotive engine simulation systems employing such motors are only useful for testing durability, steady-state characteristic, and so forth, of the power transmission, but not for testing the transitional characteristic of the power transmission at the speed ratio shifting.

However, for designing an automatic power transmission with an improved shift feeling, reduced shift shock and so forth, it is essential to obtain data of the transitional characteristic of the automatic power transmission.

In order to improve the automotive engine simulation system employing the electric motor, the above-noted Japanese Patent First Publication No. 61-53541 performs correction of a command current for the electric motor to compensate for a differential in inertia between the electric motor and the automotive engine, so as to provide a simulated transitional torque characteristic similar to that of the automotive engine. However, in this background art, a substantial delay is caused in controlling the command current, which is not suitable for specifically testing the transitional characteristic of the power transmission since the high-speed response is required for testing same. Accordingly, in this background art, it is difficult to obtain the transitional characteristic data of the power transmission equivalent to those derived by using the automotive engine.

SUMMARY OF THE INVENTION

Accordingly, it is an object of the present invention to provide a simulation system for an automotive prime mover for testing an automotive component that can eliminate the above-noted defects inherent in the background art.

It is another object of the present invention to provide a simulation system for an automotive internal combustion engine, that can provide a simulated transitional characteristic equivalent to that of the automotive engine with a high-speed response characteristic.

To accomplish the above-mentioned and other objects, according to one aspect of the present invention, a simulation system for an automotive internal combustion engine comprises a low inertia power generator including power generating means having relatively a high inertia and an inertia reducing means for reducing the inertia of the power generating means. An engine characteristic generator is provided which receives predetermined engine operation parameter simulated data for deriving a first signal indicative of a first output torque to be derived as an output of the low inertia power generator according to a preset engine output torque variation characteristic which is set in terms of the engine operation parameter simulated data. First means are provided for deriving a first correction value indicative of a first compensation torque to be compensated at the output of the low inertia power generator in view of a set engine inertia. Second means are provided for deriving a second correction value indicative of a second compensation torque to be compensated at the output of the low inertia power generator in view of a set inertia of the low inertia power generator. Third means are provided for deriving a third correction value based on the first and second correction values. The third correction value is indicative of a third compensation torque to be compensated at the output of the low inertia power generator. The third compensation torque compensates a differential in inertia between the engine and the low inertia power generator. Fourth means are further provided for deriving a control signal based on the first signal and the third correction value. The control signal is fed to the low inertia power generator for controlling operation of the relatively high inertia power generating means so as to provide a second output torque as the output of the low inertia power generator. The second output torque is equivalent to the first output torque.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to limit the present invention.

In the drawings.

DESCRIPTION OF THE PREFERRED EMBODIMENT

Now, referring to FIG. 1, a preferred embodiment of an overall structure of a bench testing apparatus or a chassis dynamometer for an automotive power transmission according to the present invention will be described hereinbelow for better understanding of a preferred embodiment of a an automotive engine simulation system according to the present invention.

Figure 1:
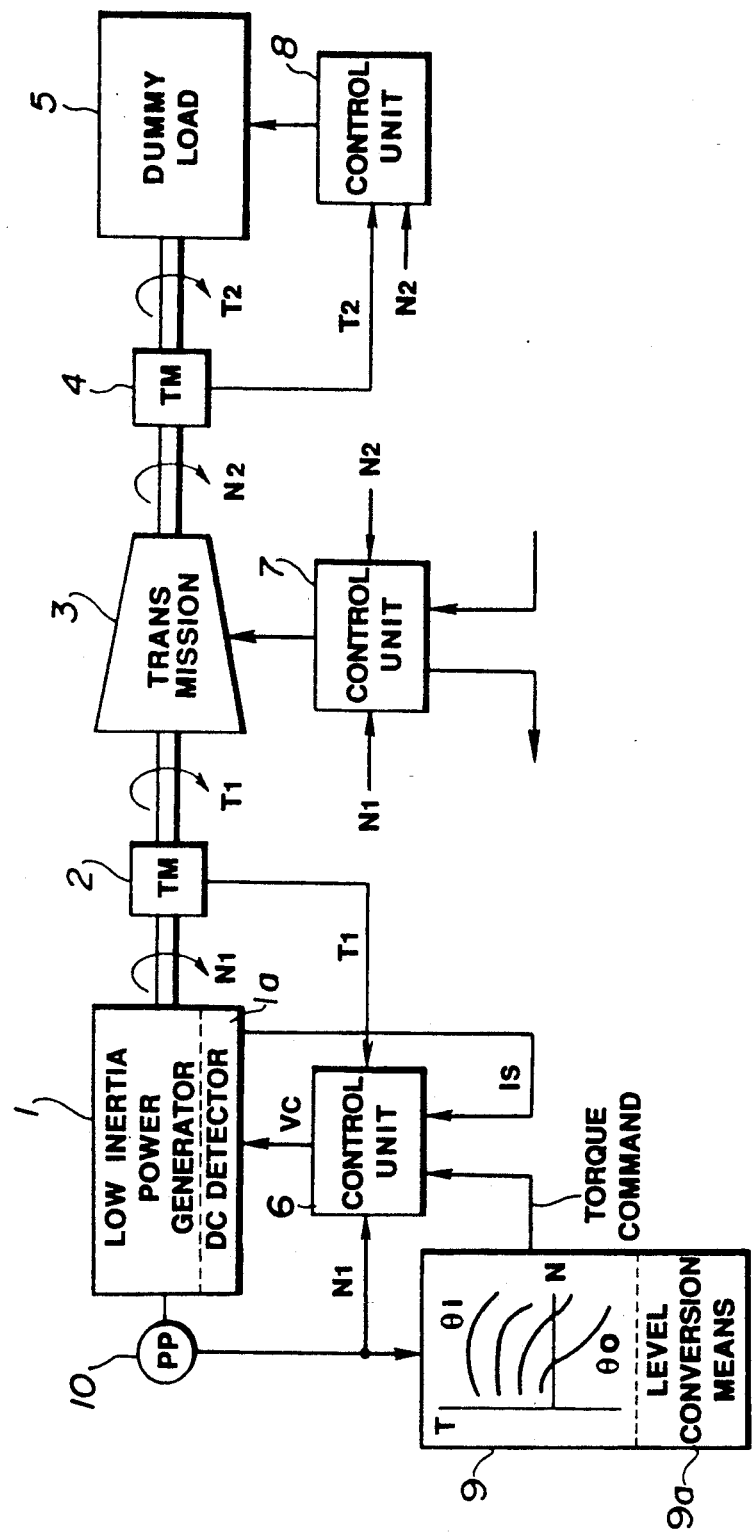
FIG. 1 is a block diagram showing an overall structure of a bench testing apparatus for an automotive automatic power transmission according to a preferred embodiment of the present invention.

In FIG. 1, a low inertia power generator 1 in the form of a so-called transient dynamometer includes a direct current motor having a relatively high inertia which is associated with a Thyristor-Leonard type current control minor loop. The direct current motor is further associated with a speed increasing device for reducing the inertia of the direct current motor. The motor is controlled by a torque command or a speed command applied through the Thyristor-Leonard type current control minor loop. The low inertia power generator is disclosed in co-pending U.S. patent applications Ser. Nos. 427,031 filed on Oct. 25, 1990, now U.S. Pat No. 5,060,176 and 436,298 filed on Nov. 13, 1990, now U.S. Pat. No. 4,984,988. The contents of the above-noted co-pending U.S. patent applications are incorporated herein by reference for the sake of disclosure.

The low inertia power generator 1 has an output shaft which is connected via a torque meter 2 to an automotive power transmission 3 to be tested. Accordingly, the power transmission 3 is driven by the output of the low inertia power generator 1. In turn, an output shaft of the power transmission 3 is connected to a dummy load 5 via a torque meter 4. A torque absorbing dynamometer with flywheels is employed as the dummy load 5.

Control units 6, 7 and 8 are provided for respectively controlling the operations of the low inertia power generator 1, the power transmission 3 and the dummy load dynamometer 5. The control unit 6 is fed with a torque command or a speed command to perform the torque control or speed control of the low inertia power generator 1. The torque command is in the form of a voltage signal converted in level so as to be indicative of a value which can be directly used for the Thyristor-Leonard type current control minor loop to provide a current value for controlling the operation of the direct current motor. The torque command is inputted to the control unit 6 from an engine characteristic generator 9.

The control unit 6 also receives a monitored direct current indicative signal Is representative of a current value actually supplied to the direct current motor. The current actually supplied to the direct current motor is monitored by a DC detector 1a which outputs the signal Is to the control unit 6. The control unit 6 performs feedback control of the current applied to the direct current motor based on the voltage signal from the engine characteristic generator 9 and the monitored current signal Is. Specifically, the control unit 6 converts the monitored current signal Is to a corresponding voltage value for comparison with the voltage signal from the engine characteristic generator 9 so as to produce a control signal Vc which is fed to the Thyristor-Leonard type current control minor loop to reduce a differential between the commanded voltage signal and the monitored current signal Is. The control unit 6 is further fed with a monitored torque indicative signal $T_1$ which is used, for example, for updating a torque-voltage characteristic map stored in the engine characteristic generator 9, which will be described later.

Figure 4:
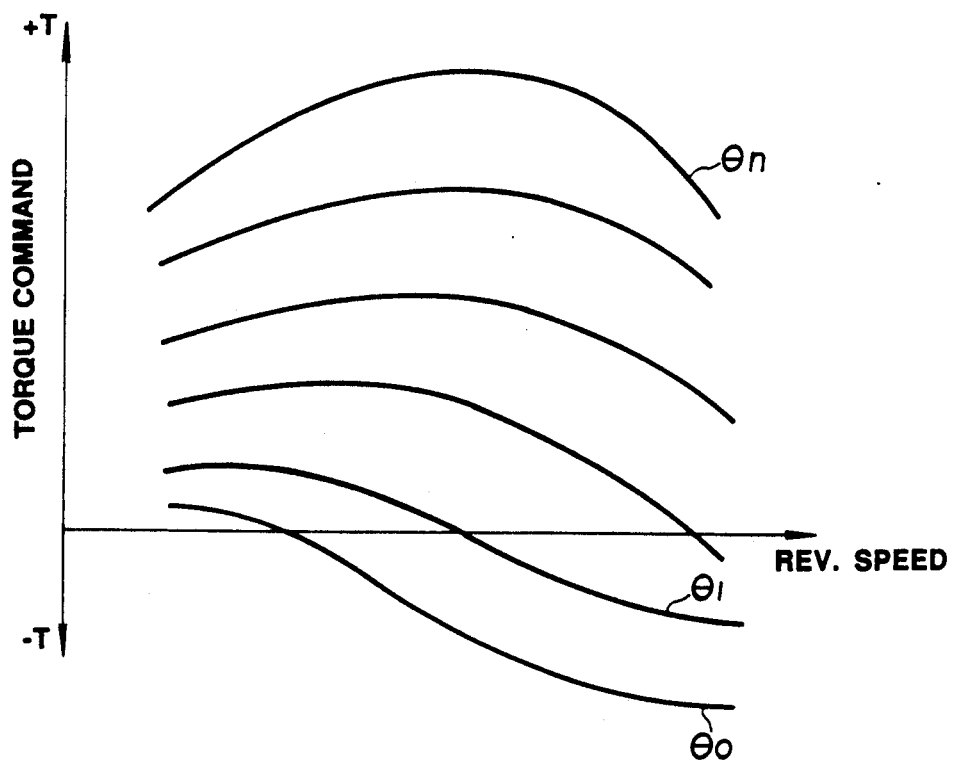
FIG. 4 is a graph showing the output characteristic of an engine characteristic generator incorporated in the preferred embodiment of FIG. 2.

The engine characteristic generator 9, having a microprocessor based unit, includes preset output torque characteristic data of the automotive engine in relation to engine speeds and engine throttle valve open angles $\theta_i$, as shown in FIG. 4. The preset characteristic data of FIG. 4 may be derived through various experiments. As appreciated, on the basis of a throttle valve open angle simulated signal $\theta_i$ and a speed signal $N_1$ indicative of a revolution speed of the output shaft of the low inertia power generator 1 or a revolution speed of an input side of the power transmission 3, which is monitored by a speed sensor 10, the required torque in the form of a corresponding voltage value is derived using the preset characteristic data of FIG. 4. The derived torque is then converted in level using the above-noted torque-voltage characteristic map stored in the engine characteristic generator 9 so as to be indicative of a value which can be used for the Thyristor-Leonard type current control minor loop to provide a current value for controlling the operation of the direct current motor.

It is to be appreciated that, though the shown embodiment utilizes the throttle valve open angle data $\theta_i$ as engine load indicative data, an intake air vacuum pressure can be utilized in place thereof.

Figure 2:
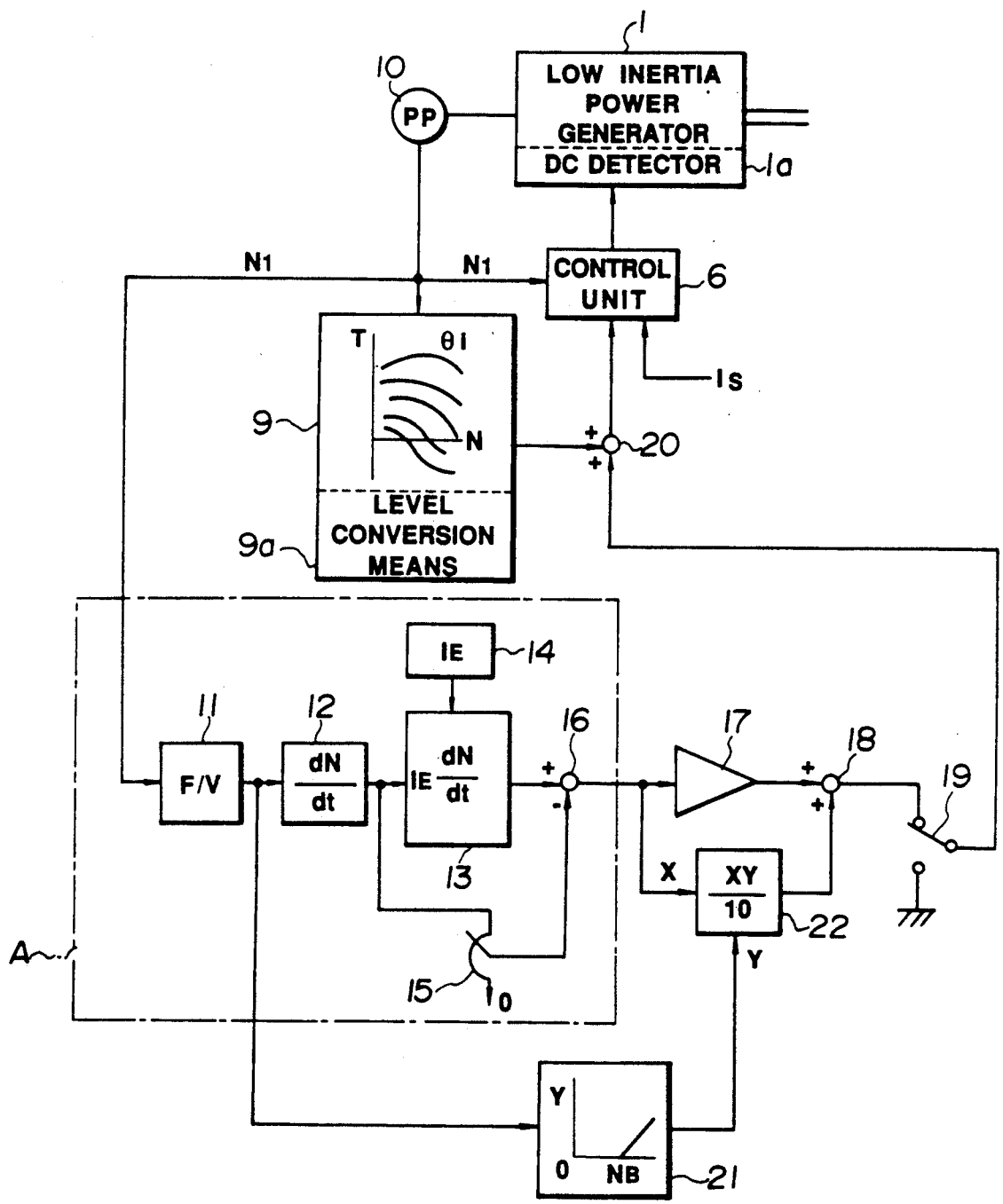
FIG. 2 is a block diagram showing a simulation system for an automotive internal combustion engine according to a preferred embodiment of the present invention.

FIG. 2 shows an automotive engine simulation system according to a preferred embodiment of the present invention. In FIG. 2, the same or similar elements are designated by the same reference numerals as in FIG. 1.

In FIG. 2, a block A, defined by a dotted line, constitutes an inertia compensating circuit and includes a frequency-voltage converter 11. The converter 11 receives the speed indicative pulse signal $N_1$ from the speed sensor 10 and converts same into a corresponding voltage signal which is then fed to a differentiating circuit 12. The differentiating circuit 12 derives a signal indicative of a speed variation dN/dt. The polarity of the speed variation indicative signal is positive during acceleration and negative during deceleration. An engine inertia setting circuit 14 sets a value indicative of an engine inertia $I_E$ simulated by the low inertia power generator 1. The output $I_E$ from the engine inertia setting circuit 14 and the speed variation indicative signal from the differentiating circuit 12 are fed to a multiplier circuit 13 which produces a signal indicative of a value of $I_E$(dN/dt). The value of $I_E$(dN/dt) indicates a torque for the output of the low inertia power generator 1 to be compensated in view of the set engine inertia at the derived speed variation dN/dt. The output of the multiplier 13 is fed to a subtracter circuit 16.

On the other hand, the output dN/dt of the differentiating circuit 12 is also fed to an inertia setting circuit 15 which sets a value indicative of an inertia of the low inertia power generator 1, to derive a value of $I_{TR-DY}$(dN/dt) indicative of a torque for the output of the low inertia power generator 1 to be compensated in view of the inertia of the low inertia power generator 1 at the derived speed variation dN/dt. The output of the inertia setting circuit 15 is also fed to the subtracter circuit 16. The subtracter circuit 16 subtracts the value of $I_{TR-DY}$(dN/dt) from the value of $I_E$(dN/dt) to derive a value of $(I_E - I_{TR-DY})$dN/dt indicative of a resultant torque for the output of the low inertia power generator 1 to be compensated in view of the differential between the set engine inertia and the low inertia power generator inertia at the derived speed variation dN/dt. In practice, the value output from the subtracter circuit 16 is proportional to a torque actually required for compensating the inertia differential between the engine and the low inertia power generator 1.

The output of the subtracter circuit 16, i.e., the output of the block A, is then fed to an operational amplifier 17 which converts a level of the output of the subtracter circuit 16 so as to be indicative of a voltage value which can be directly used for the Thyristor-Leonard type current control minor loop to provide a current value for the direct current motor to provide the actually required torque at the output of the low inertia power generator 1 as a compensation torque. The output of the operational amplifier 17 is fed to an adder circuit 18 where a correction value is added to the output from the operational amplifier 17 in case the monitored speed $N_1$ of the output shaft of the low inertia power generator 1 is no less than a predetermined basic value $N_B$, wherein the proportional relationship between the applied current and the resultant torque is not attained in the direct current motor, which will be described later with reference to FIG. 3. Accordingly, in case the monitored speed $N_1$ is less than the basic value $N_B$, no correction value is added at the adder circuit 18.

An output of the adder circuit 18 is fed to an adder circuit 20 via a switch 19 as an inertia differential compensation voltage signal for compensating the inertia differential between the engine and the low inertia power generator 1 at the output of the latter. When the switch 19 is connected to ground, no inertia compensation is performed.

As described above, the engine characteristic generator 9 derives a command torque T using the throttle valve open angle simulated signal $\theta i$ and the monitored speed $N_1$ of the output shaft of the low inertia power generator 1. The engine characteristic generator 9 includes torque-voltage conversion means 9a which converts a level of the derived command torque T so as to be indicative of a voltage value which can be directly used for the Thyristor-Leonard type current control minor loop to provide a current value for the direct current motor to provide the commanded torque T at the output of the low inertia power generator 1. The torque-voltage conversion means 9a derives the converted voltage signal using the foregoing torque-voltage characteristic map. The converted voltage signal is fed to the adder circuit 20 as the torque command.

The adder circuit 20 derives the sum of the inertia differential compensation signal from the adder circuit 18 and the torque command signal from the engine characteristic generator 9 so as to provide a resultant torque command signal to be fed to the control unit 6. The resultant torque command signal is indicative of a voltage value which can be directly used for the Thyristor-Leonard type current control minor loop as described above, so as to provide the output characteristic of the low inertia power generator 1 equivalent to that of the automotive engine, the inertia of which is set at the engine inertia setting circuit 14.

For example, it is assumed that the set inertia of the automotive engine is less than that of the low inertia power generator 1 and that the direct current motor is in acceleration. In this condition, an absolute compensation torque for the low inertia power generator 1 is greater than that for the automotive engine, and the absolute compensation torque for the low inertia power generator 1, in the form of a voltage value, should be subtracted from the converted voltage value from the engine characteristic generator 9, while the absolute compensation torque for the automotive engine, in the form of a voltage value, should be added to the converted voltage value from the engine characteristic generator 9. Accordingly, a negative command signal from the adder circuit 18 is added at the adder circuit 20 to decrease the converted voltage value from the engine characteristic generator 9 so that the inertia differential between the engine and the low inertia power generator 1 is compensated to provide the output characteristic of the low inertia power generator 1 equivalent to the automotive engine. On the other hand, if it is assumed that the direct current motor is in deceleration, then the absolute compensation torque for the low inertia power generator 1, in the form of a voltage value, should be added to the converted voltage value from the engine characteristic generator 9, while the absolute compensation torque for the automotive engine, in the form of a voltage value, should be subtracted from the converted voltage value from the engine characteristic generator 9. Accordingly, a positive command signal from the adder circuit 18 is added at the adder circuit 20 to increase the converted voltage value from the engine characteristic generator 9 so as to provide the output characteristic of the low inertia power generator 1 equivalent to the automotive engine. When the set inertia of the automotive engine is greater than that of the low inertia power generator 1, a positive command signal from the adder circuit 18 is added at the adder circuit 20 to increase the converted voltage value from the engine characteristic generator 9 during acceleration of the direct current motor, while a negative command signal from the adder circuit 18 is added at the adder circuit 20 to decrease the converted voltage value from the engine characteristic generator 9 during deceleration of the direct current motor.

As described above, the control unit 6 performs the feedback control of the control signal Vc so as to reduce a differential between the resultant command signal from the adder circuit 20 and the monitored current signal Is.

As appreciated, in the automotive engine simulation system according to the foregoing preferred embodiment, a control time delay is caused only in the electric circuit so that a significantly higher control response, with a delay of about 0.02 to 0.03 second, is attained, which is ten times faster than that in the background art.

It is to be appreciated that, though a relationship between the applied current and the derived torque is not linear due to mechanical loss therebetween, this mechanical loss is compensated using the foregoing torque-voltage characteristic map, insuring the required accuracy. Further, if necessary, a gain for compensating the mechanical loss may be set in advance in the operational amplifier 17.

Figure 3:
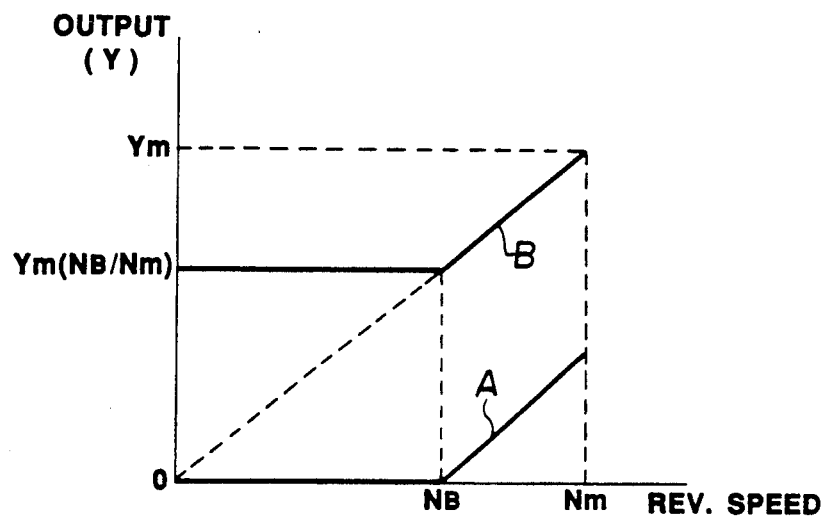
FIG. 3 is a graph showing an output characteristic of a function generator incorporated in the preferred embodiment of FIG. 2, along with the resultant output characteristic of a command signal for compensating an inertia differential during a constant acceleration or deceleration.

FIG. 3 shows the output characteristic of a function generator 21 identified by a line A as well as the output characteristic of the adder circuit 18 identified by a line B which is obtained during a constant acceleration or deceleration of the direct current motor. Specifically, as described above, the direct current motor outputs a torque proportional to an applied current during the monitored speed $N_1$ of the output shaft of the low inertia power generator 1 being less than the basic value $N_B$, while the proportional relationship between the applied current and the resultant torque is not attained at a range of the monitored speed $N_1$ between the basic value $N_B$ and a maximum speed value Nm. Accordingly, as seen from the line A, an output voltage Y of the function generator 21 is set at zero during the monitored speed $N_1$ being less than the basic value $N_B$, while the output voltage Y of the function generator 21 increases linearly with the increment of the monitored speed $N_1$ in the range of the monitored speed $N_1$ between $N_B$ and $N_m$.

Referring back to FIG. 2, the function generator 21 receives the output of the frequency-voltage converter 11 so as to feed the output Y according to a magnitude of the converted voltage indicative of the monitored speed $N_1$ of the output shaft of the low inertia power generator 1, using the foregoing line A in FIG. 3. The output Y of the function generator 21 is then fed to a multiplier circuit 22 which also receives the output X of the foregoing subtracter circuit 16. The multiplier circuit 22 processes the outputs X and Y to produce a signal indicative of a value identified by XY/10, which is then fed to the adder circuit 18. As appreciated, the output value of the multiplier circuit 22 becomes zero during the monitored speed $N_1$ being less than the basic value $N_B$ so that no correction value is added at the adder circuit 18. On the other hand, when the monitored speed $N_1$ is in the range between $N_B$ and $N_m$, the output value of the multiplier circuit 22 increases with the increment of the monitored speed $N_1$ so that a correction value is added to the output of the operational amplifier 17 at the adder circuit 18 so as to provide the proportional relationship between the applied current and the resultant torque even when the monitored speed $N_1$ is in the speed range between $N_B$ and $N_m$. Accordingly, the output from the adder circuit 18 becomes as indicated by the line B in FIG. 3 during a constant acceleration or deceleration of the direct current motor or the low inertia power generator 1.

It is to be understood that this invention is not to be limited to the embodiment described above, and that various changes and modifications may be made without departing from the spirit and scope of the invention as defined in the appended claims. For example, in the foregoing preferred embodiment, though the power transmission is shown as an automotive component to be tested, the present invention is also applicable to other automotive components, and is particularly advantageous for testing such an automotive component which requires the high-speed control response.

What is claimed is:

1. A simulation system for an automotive internal combustion engine, comprising:
    a low inertia power generator including power generating means having relatively high inertia and inertia reducing means for reducing the inertia of said power generating means;
    an engine characteristic generator receiving predetermined engine operation parameter simulated data for deriving a first signal indicative of a first output torque to be derived as an output of said low inertia power generator according to a preset engine output torque variation characteristic which is set in terms of said engine operation parameter simulated data;
    first means for deriving a first correction value indicative of a first compensation torque to be compensated at the output of said low inertia power generator in view of a set engine inertia;
    second means for deriving a second correction value indicative of a second compensation torque to be compensated at the output of said low inertia power generator in view of a set inertia of said low inertia power generator;
    third means for deriving a third correction value based on said first and second correction values, said third correction value indicative of a third compensation torque to be compensated at the output of said low inertia power generator, said third compensation torque compensating a differential in inertia between the engine and the low inertia power generator;
    fourth means for deriving a control signal based on said first signal and said third correction value, said control signal fed to said low inertia power generator for controlling operation of said relatively high inertia power generating means so as to provide a second output torque as the output of said low inertia power generator, said second output torque being equivalent to said first output torque.

2. The simulation system as set forth in claim 1, wherein said first means derives said first correction value based on a speed variation of an output shaft of said low inertia power generator and a set inertia of the engine.

3. The simulation system as set forth in claim 2, wherein said second means derives said second correction value based on said variation and a set inertia of said low inertia power generator.

4. The simulation system as set forth in claim 1, wherein said third means derives said third correction value by subtracting said second correction value from said first correction value.

5. The simulation system as set forth in claim 4, wherein said first means derives said first correction value by multiplying a speed variation of an output shaft of said low inertia power generator by a set inertia of the engine, and wherein said second means derives said second correction value by multiplying said speed variation by a set inertia of said low inertia power generator.

6. The simulation system as set forth in claim 5, wherein fifth means is provided for converting a level of said third correction value so as to be indicative of a value which is adapted to be directly fed to said low inertia power generating means for controlling the operation of said relatively high inertia power generating means so as to provide said third compensation torque at the output of the low inertia power generator.

7. The simulation system as set forth in claim 6, wherein sixth means is provided for converting a level of said first signal so as to be indicative of a value which is adapted to be directly fed to said low inertia power generator for controlling the operation of said relatively high inertia power generating means so as to provide said first output torque at the output of said low inertia power generator.

8. The simulation system as set forth in claim 7, wherein said fourth means derives said control signal by deriving a sum of said level converted first signal and said level converted third correction value.

9. The simulation system as set forth in claim 8, wherein seventh means is provided for monitoring a current value actually supplied to said relatively high inertia power generating means, and wherein eighth means is provided for correcting said control signal based on said monitored current value through feedback control.

10. The simulation system as set forth in claim 6, wherein ninth means is provided for deriving a fourth correction value when a speed of said output shaft of the low inertia power generator is greater than a predetermined value, said fourth correction value correcting said level converted third correction value so as to provide a proportional relationship between a current value applied to said relatively high inertia power generating means and a resultant torque of said relatively high inertia power generating means.

11. The simulation system as set forth in claim 1, wherein said relatively high inertia power generating means is a direct current motor and said inertia reducing means is a speed increasing device.

* * * * *